US009788474B2

(12) United States Patent
Schumacher et al.

(10) Patent No.: US 9,788,474 B2
(45) Date of Patent: Oct. 17, 2017

(54) SOWING HEART CONTROL APPARATUS, SOWING HEART AND SINGLE SEED DRILL

(71) Applicant: KVERNELAND AS, Kvernaland (NO)

(72) Inventors: Ferdinand Schumacher, Lippetal-Oestinghausen (DE); Volker Schanzenbach, Hagen a.T.W. (DE)

(73) Assignee: KVERNELAND AS, Kvernaland (NO)

( * ) Notice: Subject to any disclaimer, the term of this patent is extended or adjusted under 35 U.S.C. 154(b) by 0 days.

(21) Appl. No.: 14/414,923

(22) PCT Filed: Feb. 26, 2014

(86) PCT No.: PCT/EP2014/053715
§ 371 (c)(1),
(2) Date: Jan. 15, 2015

(87) PCT Pub. No.: WO2014/191124
PCT Pub. Date: Dec. 4, 2014

(65) Prior Publication Data
US 2015/0181798 A1   Jul. 2, 2015

(30) Foreign Application Priority Data

May 27, 2013   (EP) ..................... 13169382

(51) Int. Cl.
*A01C 7/18*   (2006.01)
*A01C 7/20*   (2006.01)
(Continued)

(52) U.S. Cl.
CPC .............. *A01C 7/046* (2013.01); *A01C 7/102* (2013.01); *A01C 7/20* (2013.01)

(58) Field of Classification Search
CPC .. A01C 7/00; A01C 7/04; A01C 7/042; A01C 7/044; A01C 7/046; A01C 7/102; A01C 7/105
(Continued)

(56) References Cited

U.S. PATENT DOCUMENTS 4,469,244 A * 9/1984 Maury .................... A01C 7/046
111/77
4,511,061 A * 4/1985 Gaspardo ............... A01C 7/046
111/77
(Continued)

FOREIGN PATENT DOCUMENTS

AT        353043 B      10/1979   ............... A01C 7/04
DE    102004045654 A1    3/2006   ............... A01C 7/04
(Continued)

OTHER PUBLICATIONS

International Search Report from corresponding International Patent Application No. PCT/EP2014/053715, dated Jun. 13, 2014 (English-language translation provided).
(Continued)

*Primary Examiner* — John G Weiss
(74) *Attorney, Agent, or Firm* — Kusner & Jaffe

(57) ABSTRACT

A sowing heart control apparatus for controlling a sowing heart with a sowing heart monitoring apparatus having an evaluation unit for determining the occupancy of sowing holes of a rotating seed disk with a seed in operation. The evaluation unit delivers an actual value of the occupancy of one or more sowing holes. The sowing heart control apparatus, depending on a deviation of the actual occupancy value from a predetermined setpoint of the occupancy of one or more sowing holes, controlling actuating elements which influence the occupancy. The invention also relates to a sowing heart and a single seed drill.

6 Claims, 4 Drawing Sheets

(51) Int. Cl.
*A01C 7/04* (2006.01)
*A01C 7/10* (2006.01)

(58) Field of Classification Search
USPC ........ 111/177, 179, 181, 184, 185; 222/154, 222/14, 52; 221/9, 14, 226
See application file for complete search history.

(56) References Cited

U.S. PATENT DOCUMENTS

| | | | | |
|---|---|---|---|---|
| 7,478,603 | B2* | 1/2009 | Riewerts | A01C 7/046 |
| | | | | 111/200 |
| 8,752,490 | B2* | 6/2014 | Beaujot | A01C 7/04 |
| | | | | 111/178 |
| 8,942,896 | B2* | 1/2015 | Mayerle | A01C 7/102 |
| | | | | 111/185 |
| 9,185,841 | B2* | 11/2015 | Schumacher | A01C 7/046 |
| 2007/0266917 | A1 | 11/2007 | Riewerts et al. | 111/200 |
| 2011/0046776 | A1* | 2/2011 | Goldman | A01C 7/046 |
| | | | | 700/225 |
| 2014/0014012 | A1* | 1/2014 | Schumacher | A01C 7/046 |
| | | | | 111/177 |
| 2015/0250093 | A1 | 9/2015 | Scheideler | A01C 7/046 |

FOREIGN PATENT DOCUMENTS

| | | | | |
|---|---|---|---|---|
| DE | 102011001949 A1 | 10/2012 | ............... | A01C 7/04 |
| EP | 1 637 026 A1 | 3/2006 | ............... | A01C 7/04 |
| EP | 1 749 428 A1 | 2/2007 | ............... | A01C 7/04 |
| EP | 1889532 A2 | 2/2008 | ............... | A01C 7/10 |
| WO | WO 2005/096798 A1 | 10/2005 | ............... | A01C 7/00 |
| WO | WO 2005/096799 A1 | 10/2005 | ............... | A01C 7/00 |
| WO | WO 2008/135772 A1 | 11/2008 | ............... | A01C 7/10 |

OTHER PUBLICATIONS

"Amazonen-Werke, Scraper remote adjustment EDX" of Jul. 2010.
"Amazone smartcontrol" with "Silbermedaille Agritechnica 2009" (English translation provided).
"Silbermedaille Agritechnica 2009: smartControl für Einzelkornsägerät EDX" (English translation provided).

* cited by examiner

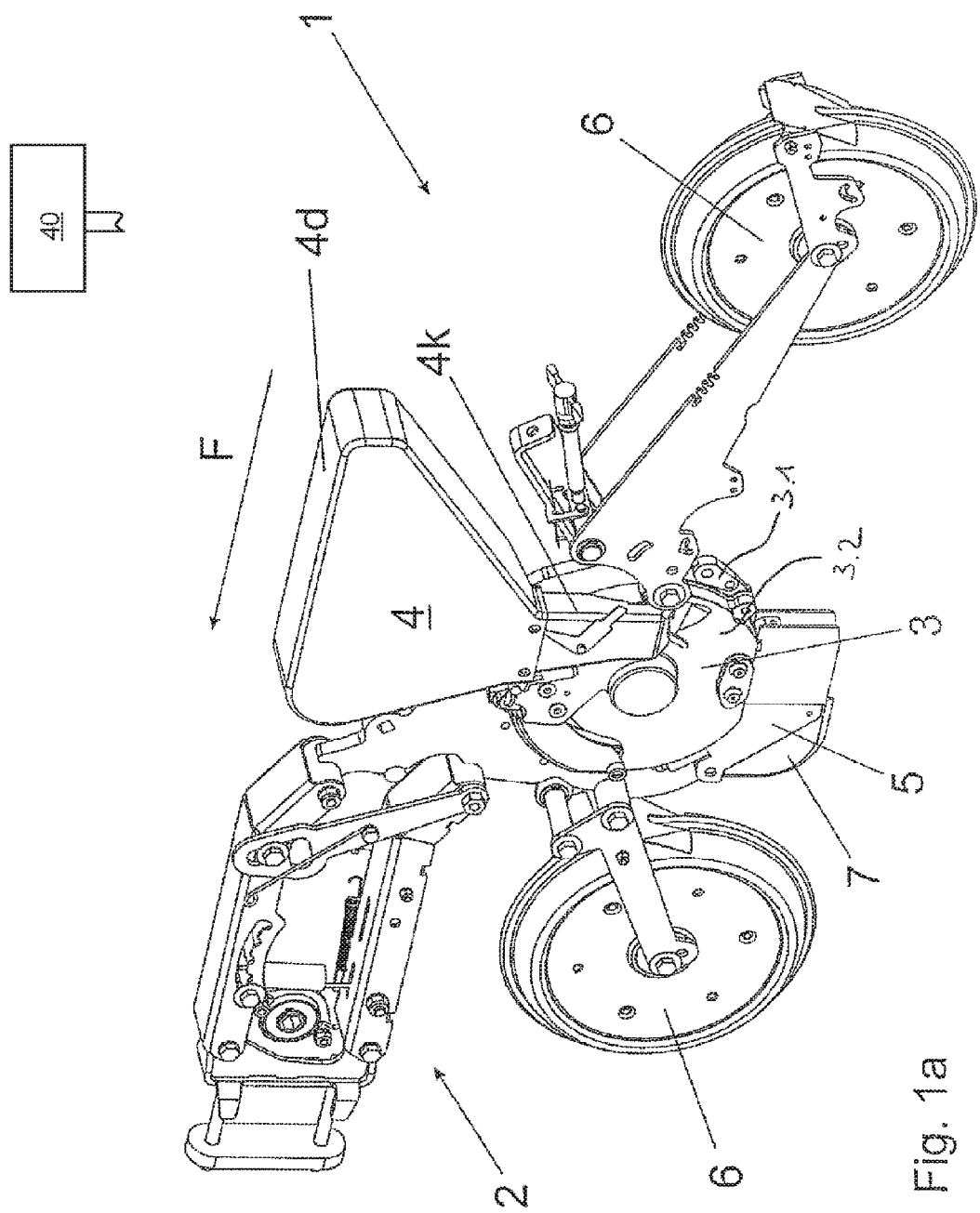

SOWING HEART CONTROL APPARATUS, SOWING HEART AND SINGLE SEED DRILL

FIELD OF THE INVENTION

The invention relates to a sowing heart control apparatus, a sowing heart, and a single seed drill.

BACKGROUND OF THE INVENTION

Monitoring apparatus for monitoring the operation of single seed drills are known in various versions. Often the monitoring is carried out on a conveyor channel due to easy accessibility, such as for example in document WO 2005/096799 A1 or WO 2005/096798 A1.

Monitoring devices are used among others to control and regulate as well as check the proper operation of sowing devices. There is the requirement that the monitoring responds promptly and works properly and simply. Furthermore, the monitoring apparatus should work as economically and as free of maintenance as possible.

DE 10 2011 001 949 A1 describes a sowing heart monitoring apparatus for a sowing heart, pulses generated by a line scanning camera being evaluated by an evaluation unit in order to evaluate the occupancy of each sowing hole immediately after detection, therefore on-line.

SUMMARY OF THE INVENTION

The object of this invention is therefore to devise a sowing heart control apparatus with which a better sowing result is achieved.

This object is achieved with the features recited in the independent claim(s). Advantageous developments of the invention are given in the dependent claims. All combinations of at least two of the features given in the specification, the claims and/or the figures also fall within the scope of the invention. To the extent value ranges are indicated, any intermediate values should also be considered disclosed as boundary values.

The basic idea of this invention is to control the actuating elements which influence the occupancy of the sowing holes by evaluating the occupancy of one or more holes, especially of a group of sowing holes, such that each sowing hole is occupied with a single seed grain as much as possible at all times. Control can thus take place automatically during delivery of a certain type of seed without the necessity of manual intervention during the delivery of the seed due to faulty occupancy or shutdown of the sowing device being necessary. In particular, the sowing heart control apparatus based on the data of the evaluation unit in current operation can evaluate individual sowing holes or preferably groups of sowing holes and directly change the occupancy based on the actuating elements which influence the occupancy. Preferably, output parameters for operation of the sowing heart can be preset or are preset depending on the selected seed, in particular pressure/negative pressure of a fan for producing negative pressure on the sowing holes of the feed disk and/or a flap position on the fan for setting the negative pressure on the sowing holes or of the ratio of the pressure to the negative pressure and/or a speed of a stifling shaft in a receiving section in the sowing heart and/or a position of a scraper for scraping excess seed on sowing hearts of the seed disk.

The control by the sowing heart control apparatus can proceed according to the invention especially as follows:

determination of an actual value of the occupancy of one or more sowing holes, especially a group of sowing holes, and evaluation by the evaluation unit, to the extent underoccupancy or overoccupancy of the individual sowing holes or the group of sowing holes is ascertained, preset control variables of actuating elements are changed in defined increments depending on the underoccupancies or overoccupancies which have been determined by the evaluation unit, repetition of the aforementioned steps, especially continuously or at preset intervals during operation of the sowing heart.

According to one advantageous embodiment of this invention, the sowing heart monitoring apparatus is made such that electromagnetic waves generated by a radiation source after reflection on a reflection surface of the rotatable seed disk can be detected by a line scanning camera and can be evaluated by the evaluation unit. In this way, evaluation and control can be implemented on-line with extremely fast direct reaction times. Reference is made in this respect to the disclosure of DE 10 2011 001 949 A1.

To the extent the actuating elements encompass at least one scraper which can be adjusted in the direction of the seed disk for scraping of excess seed on the seed disk, it is possible to act not only directly on the occupancy by the scraper being adjusted in the direction of the seed disk, therefore the distance between the seed disk and a scraping surface of the scraper being enlarged or diminished, but also any wear of the scraper being automatically considered. In particular, an adjustment region (corridor) is fixed within which adjustment of the scraper by the sowing heart control apparatus is allowable, which is predetermined as the adjustment range preferably depending on the type of seed. For overoccupancy of one or more sowing holes, the distance between the scraping surface of the scraper and of the seed disk is automatically reduced and correspondingly enlarged for underoccupancy.

Alternatively or in addition to the adjustable scraper as an actuating element it is conceivable in another embodiment of the invention that to move the seed the actuating elements comprise at least one stifling shaft which is located in a receiving section for accommodating the seed on the seed disk. Movement of the seed which takes place in addition to the natural movement of the seed along the seed disk and which runs especially transversely thereto leads to better occupancy of the sowing holes, especially for underoccupancy. In this case, in particular, the speed of the stirring shaft can be increased. In particular, one axis of the stifling shaft runs in the radial direction to the seed disk and parallel to one flat side of the seed disk. In particular, a stifling section of the stirring shaft is located in a storage area of the sowing heart, preferably in the area of a seed intake.

In another advantageous embodiment, the actuating elements alternatively or in addition to the adjustable scraper and/or the stirring shaft comprise a fan motor to produce negative pressure on the sowing holes. According to the invention, the negative pressure which prevails on the sowing holes for accommodating the seed on the sowing holes can be controlled by the control of the fan motor. If underoccupancy is ascertained by the evaluation unit, the negative pressure is increased and in the case of overoccupancy, the negative pressure is reduced, especially in the region of a negative pressure range (corridor) which is established preferably relative to the respective seed.

According to the invention preferably a combination of the adjustable scraper, the stirring shaft and the triggering of the fan motor is provided as actuating elements so that in particular control priorities can be established and/or a control sequence in the case of underoccupancy and/or overoccupancy can be established, preferably each separately, preferably depending on the respective seed.

In the case of an especially statistically significant underoccupancy, according to the invention in particular especially the following method is conceivable:

1. Turn on the stifling shaft or increase the speed of the stifling shaft, especially in steps up to a maximum set speed, in particular depending on the type of seed,
2. if an especially statistically significant underoccupancy is still ascertained, reduction of the distance of the scraper to the seed disk, especially up to a minimum distance, preferably preset depending on the seed,
3. if an especially statistically significant underoccupancy is still ascertained by the evaluation unit, increase of the speed of the fan and thus reduction of the pressure (increase of the negative pressure) on the sowing holes.

In the case of an especially statistically significant overoccupancy the reverse sequence can be followed.

Other advantages, features and details of the invention will become apparent from the following description of preferred exemplary embodiments and using the drawings.

BRIEF DESCRIPTION OF THE DRAWINGS

FIGS. 1a and 1b show perspective views of one embodiment of a single seed sowing set of a generic single seed drill with a sowing heart in the direction of travel from obliquely behind (FIG. 1a) and from obliquely forward (FIG. 1b)

The same components and components with the same function are labelled with the same reference numbers.

DETAILED DESCRIPTION OF PREFERRED EMBODIMENT

Figure 1B:
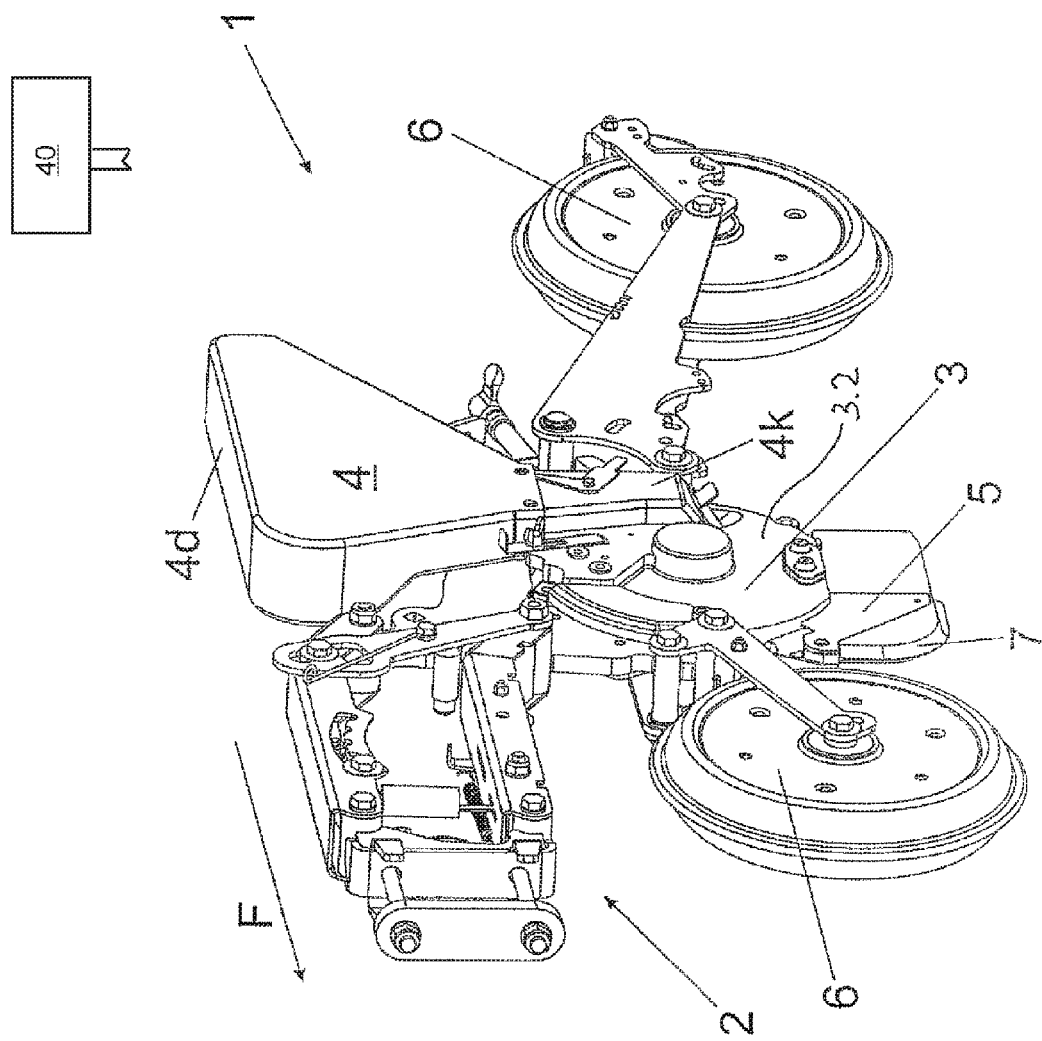
Figure 2:
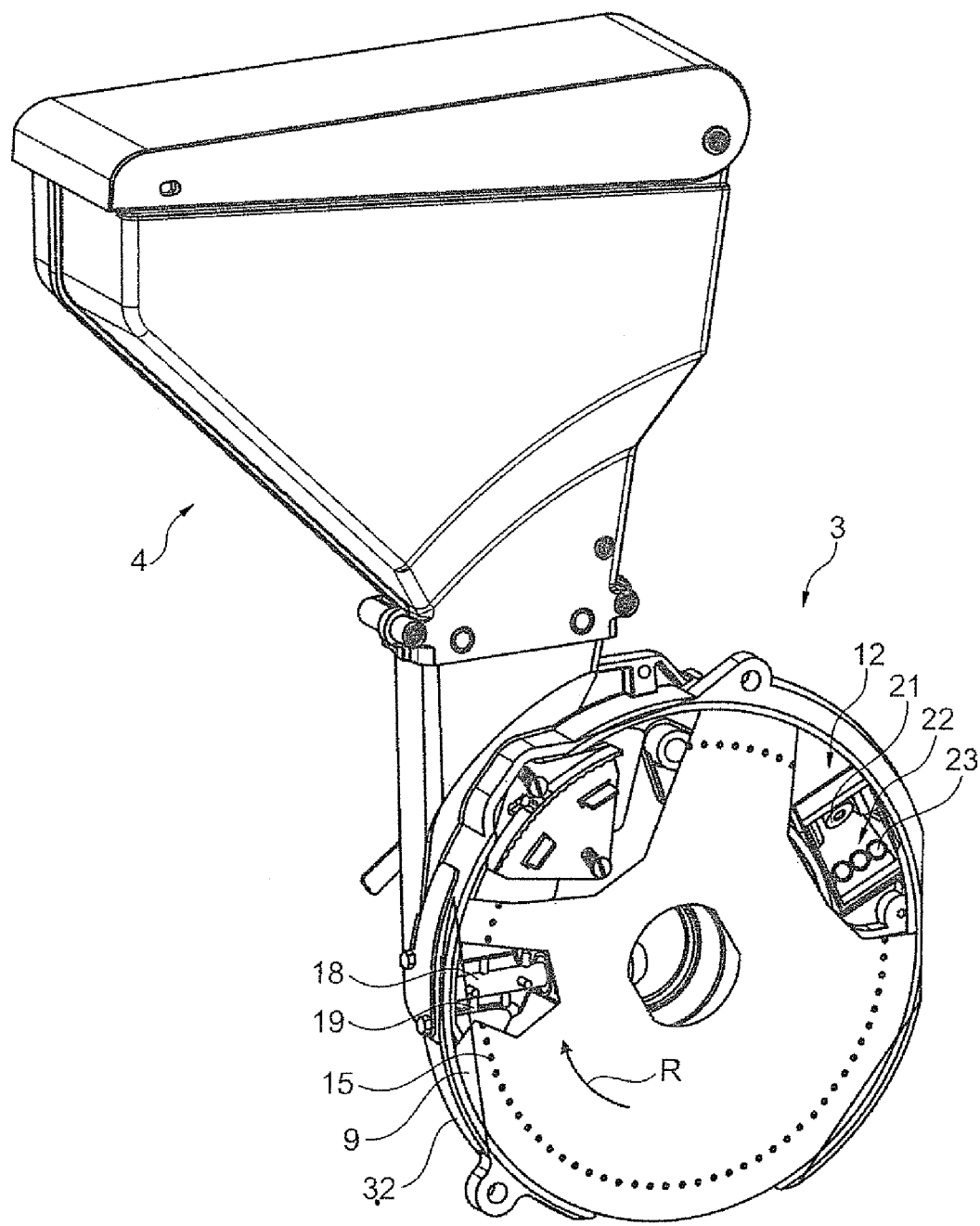
FIG. 2 shows a perspective view of the sowing heart of the embodiment according to FIG. 1 with the opened sowing heart and a partially illustrated seed disk with sowing holes and FIG. 3 shows a side view of the sowing heart according to FIG. 1 with the sowing heart opened.
Figure 3:
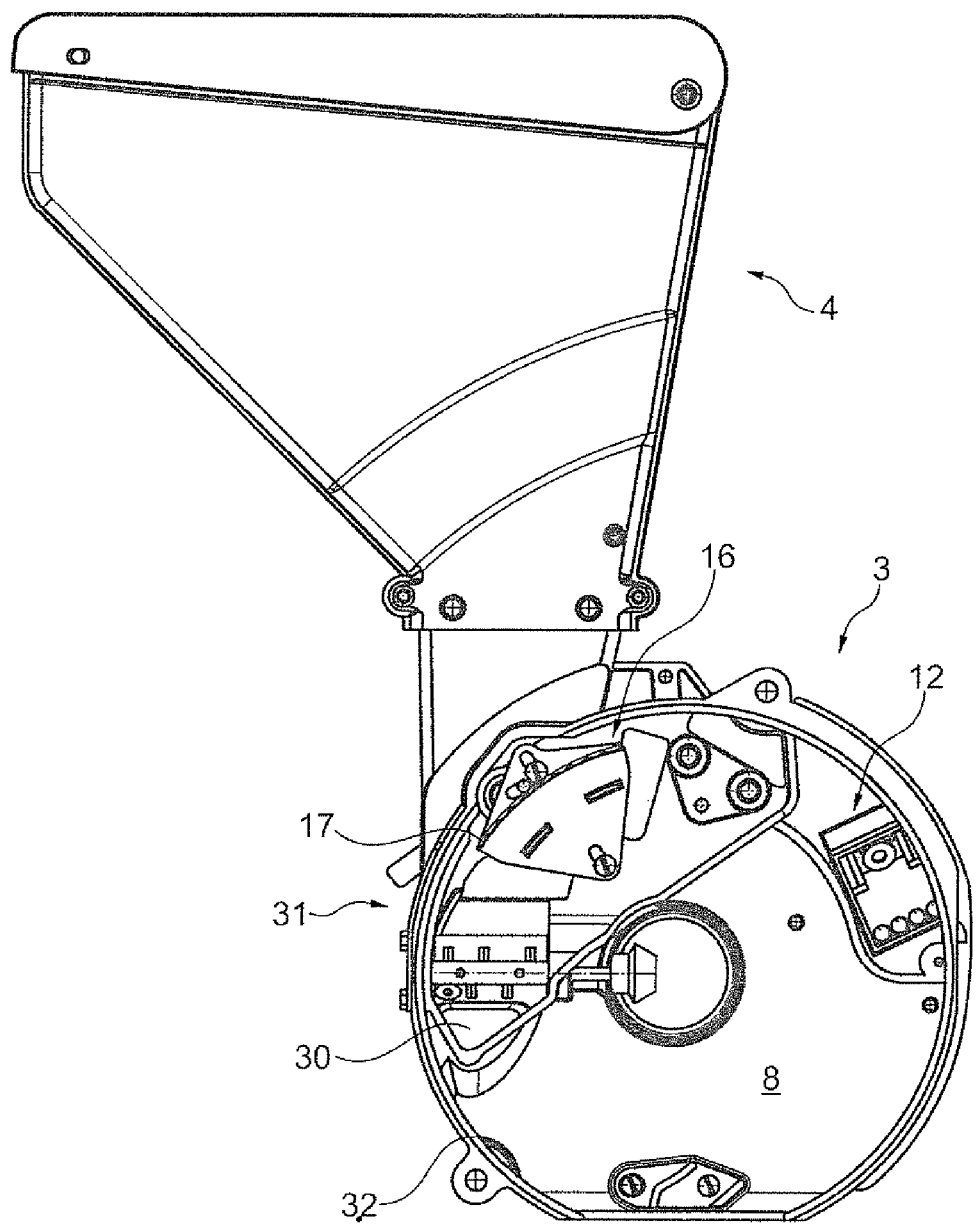

Figures 1a and 1b show a sowing set 1 of a single seed drill according to the invention which is attached via an arm 2 to the frame of the single seed drill. Accordingly, the direction of travel during operation of the single seed drill is in the direction indicated by the arrow F.

A sowing heart 3, a tank 4 which is located above the sowing heart 3, a coulter 5 which is located underneath the sowing heart 3 and two road wheels 6 which can swivel relative to the sowing heart 3 and which are located in front of and behind the sowing heart 3 in the direction F of travel are mounted on the arm 2 which allows a swivelling motion, preferably as a vertical motion, by formation of the arm 2 as a parallelogram. The tank 4 can be closed by way of a cover 4d and can be filled with seed which is in turn routed via a channel 4k laterally into the sowing heart 3.

The seed is isolated in the sowing heart 3 and is deposited via the coulter 5 into a furrow in the soil which has been opened by a tip 7 of the coulter 5.

The sowing heart 3 includes a first half 3.1 and a second half 3.2 which define a sowing heart housing and a working space 8 which is located in it. The working space 8 is subdivided into a pressure side and a seed side by a seed disk 9.

Sowing holes 15 by which the pressure side and the seed side are connected are distributed concentrically to the round seed disk 9 on the periphery of the seed disk 9 (sowing hole circle). Otherwise, the pressure side and the seed side are sealed off from one another by the seed disk 9 and corresponding seals.

In the half 3.2 the seed arrives from the tank 4 via an intake 30 in a receiving section 31 for accommodating the seed on the seed disk 9. At least in the receiving section 31 on the sowing holes 15 there is a negative pressure which is produced by a negative pressure region of the first half 3.1. A fan motor which can be controlled by the sowing heart control apparatus is connected to the negative pressure region.

Depending on the seed to be isolated, the sowing holes 15 have suitable diameters which are especially in the range from 0.5 mm to 3 mm.

Ideally each sowing hole 15 accommodates a single seed grain; this does not always work 100% especially due to the different form of the grains of each seed in practice. Depending on the seed used and depending on the setting of the sowing heart 3 and the driving speed, it happens that a sowing hole 15 does not accept a seed grain or does accept even several seed grains. At the corresponding sowing site in the soil, this then leads to either a plant not growing or two plants growing which are not adequately supplied with nutrients and therefore remain underdeveloped.

But, it is especially critical if individual sowing sets of a single seed drill fail completely, for example by a malfunction or high degree of fouling.

The sowing heart control apparatus in the illustrated embodiment comprises especially the following components:

1. a sowing heart monitoring apparatus 12 for determining the occupancy of the sowing holes 15 of the rotating seed disk with seed grains in operation,
2. an adjustable scraper 16 with a scraping surface 17 for scraping excess seed on the seed disk 9,
3. a stirring shaft 18 which has stirring naps 19 for intensifying the movement of the seed in the receiving section 31,
4. the fan for producing a negative pressure on the sowing holes 15 which are located in the receiving section 31,
5. a control device 40 which comprises especially the evaluation unit, preferably software-controlled.

The stirring shaft 18 is located in the region of the intake 30 and/or at the start of the receiving section 31, which start is located in the direction R of rotation. The region of the intake 30 is provided especially with a level monitoring in order to counteract an overly strong conveyor action of the stifling shaft. When the level monitoring delivers a corresponding signal that there is too little or no seed in the region of the intake 30, the speed of the stirring shaft 18 is reduced or the rotation of the stifling shaft 18 is stopped.

The scraper 16 is located in the direction R of rotation preferably between the stirring shaft 18 and the sowing heart monitoring apparatus 12, in particular nearer the stirring shaft 18 than the sowing heart monitoring apparatus 12.

The scraper 16 in the illustrated embodiment has a scraping element which can be adjusted transversely to the direction of rotation or plane of rotation in order to be able to set a distance between the scraping surface 17 and the seed disk 9.

To the extent the seed disk 9 has two sowing hole circles with sowing holes 15, the scraper 16 has preferably two scraping elements which are coupled and/or are made to be adjustable to one another. The scraping elements are preferably spring-loaded, especially jointly, in the direction of the seed disk.

The sowing heart monitoring apparatus 12 is located in particular on one end of the receiving section 31 which lies in the direction R of rotation since as much as possible at this site a single seed grain is to be accommodated on each sowing hole 15 and this is thus an optimum site for detecting the occupancy of each sowing hole 15 or group of sowing holes 15. The sowing heart monitoring apparatus 12 comprises a line scanning camera 21 and a radiation source 22, especially consists of four LEDs 23. During detection, light emerging from the radiation source 22 is incident at a certain angle on the rotating seed disk 9, which acts as a reflection surface. The light is reflected on the reflection surface in the direction of the line scanning camera 21 and is detected as a contrast value by the line scanning camera 21.

The radiation source 22 is angled such that the electromagnetic waves, which have been emitted by the radiation source 22 in the radiation direction, detect the sowing holes 15 of the seed disk 9 on the reflection surface. The electromagnetic waves are reflected differently from the reflection surface than from the sowing holes 15. Depending on whether no seed grains, one seed grain or two seed grains adhere to the detected sowing hole 15, for each case the influence on the reflected electromagnetic waves is different. The reflected electromagnetic waves are acquired by the line scanning camera 21 and are evaluated by the evaluation unit, advantageously only contrasts being acquired since the dull, metallic seed disk 9 as an ideal reflection surface has a contrast value, which is very different from the sowing holes 15 and the seed grains.

The line scanning camera 21 continuously measures the contrast values of one section of the seed disk 9 which is rotating past in the region of the sowing holes 15 and for each sowing hole 15 there is a rise of the contrast values depending on whether the sowing holes 15 is not occupied, occupied with one or occupied with two seed grains.

In particular, a statistical evaluation of the acquired values, especially contrast values of an individual sowing hole or group of sowing holes, takes place, wherein it is advantageous according to the invention to leave extreme values ignored. Depending on values predetermined for different seeds and determined standard deviations, boundary values can be predetermined in the evaluation unit and correspond especially to two- or three-times the standard deviation. In this way the values, which have been determined for each basic totality, can be assigned by the evaluation unit to one of the three cases, no occupancy, one seed grain or two seed grains.

To the extent especially statistically significant underoccupancy and/or especially statistically significant overoccupancy of one sowing hole or preferably a plurality of sowing holes is ascertained by an evaluation unit, the actuating elements which influence the occupancy are triggered or corresponding control variables are changed in the aforementioned manner. The respective actuating elements can be made self-regulating.

Reference number list 1 sowing set
2 arm
3 sowing heart
3.1 half
3.2 half
4 tank
4d cover
4k channel
5 coulter
6 road wheels
7 coulter tip
8 working space
9 seed disk
12 sowing heart monitoring apparatus
15 sowing holes
16 scraper
17 scraping surface
18 stirring shaft
19 stirring naps
21 line scanning camera
22 radiation source
23 LEDs
30 intake
31 receiving section
R direction of rotation
40 control device Having described the invention, the following is claimed:

1. A sowing heart control apparatus for controlling a sowing heart, the sowing heart control apparatus comprising:
   a sowing heart monitoring apparatus including:
      a camera for detecting electromagnetic waves reflected by a surface of a rotatable seed disk having one or more sowing holes, wherein the one or more sowing holes receive seed grains in a receiving section of the sowing heart, and
      an evaluation unit using the detected electromagnetic waves reflected by the surface of the rotatable disk to determine an actual occupancy value for each of the sowing holes, the actual occupancy value indicative of whether there are (i) no seed grains present in each of the one or more sowing holes, (ii) one seed grain present in each of the one or more sowing holes, or (iii) more than one seed grain present in each of the one or more sowing holes, and
   an automated control device providing control signals for controlling one or more actuating elements that influence occupancy of the one or more sowing holes, wherein the automated control device directly changes the occupancy of the one or more sowing holes in the receiving section of the sowing heart through direct control of the actuating elements, wherein the occupancy of the one or more sowing holes is changed by the automated control device depending on a deviation of the actual occupancy value determined by the evaluation unit from a predetermined setpoint occupancy value.

2. The sowing heart control apparatus as claimed in claim 1, wherein the camera is a line scanning camera.

3. The sowing heart control apparatus as claimed in claim 1, wherein the actuating elements include:
   at least one stirring shaft having stirring naps for contacting seed grains to increase movement of the seed grains, said at least one stirring shaft located in the receiving section of the sowing heart, wherein a speed of the at least one stirring shaft is adjustable by said automated control device.

4. The sowing heart control apparatus as claimed in claim 1, wherein the actuating elements include:
   a fan having a fan motor for producing negative pressure on the one or more sowing holes, wherein a speed of the fan motor is adjustable by said automated control device to modify the negative pressure.

5. A sowing heart for a single seed drill, the sowing heart comprising:
   a seed disk rotatable in one direction of rotation, said seed disk having one or more sowing holes distributed concentrically to the seed disk for adhesion of individual seed grains along at least one concentric sowing hole circle, the one or more sowing holes receiving seed grains in a receiving section of the sowing heart; and a sowing heart control apparatus for controlling the sowing heart, the sowing heart control apparatus including:

a sowing heart monitoring apparatus including:

a camera for detecting electromagnetic waves reflected by a surface of the rotatable seed disk having one or more sowing holes, wherein the one or more sowing holes receive seed grains in a receiving section of the sowing heart, and an evaluation unit using the detected electromagnetic waves reflected by the surface of the rotatable disk to determine an actual occupancy value for each of the sowing holes, the actual occupancy value indicative of whether there are (i) no seed grains present in each of the one or more sowing holes, (ii) one seed grain present in each of the one or more sowing holes, or (iii) more than one seed grain present in each of the one or more sowing holes, and an automated control device providing control signals for controlling one or more actuating elements that influence occupancy of the one or more sowing holes, wherein the automated control device directly changes the occupancy of the one or more sowing holes in the receiving section of the sowing heart through direct control of the one or more actuating elements, wherein the occupancy of the one or more sowing holes is changed by the automated control device depending on a deviation of the actual occupancy value determined by the evaluation unit from a predetermined setpoint occupancy value.

6. A single seed drill comprising:

a sowing heart comprising:

a seed disk rotatable in one direction of rotation, said seed disk having one or more sowing holes distributed concentrically to the seed disk for adhesion of individual seed grains along at least one concentric sowing hole circle; and a sowing heart control apparatus for controlling a sowing heart, the sowing heart control apparatus including:

a sowing heart monitoring apparatus including:

a camera for detecting electromagnetic waves reflected by a surface of the rotatable seed disk having one or more sowing holes, wherein the one or more sowing holes receive seed grains in a receiving section of the sowing heart, and an evaluation unit using the detected electromagnetic waves reflected by the surface of the rotatable disk to determine an actual occupancy value for each of the sowing holes, the actual occupancy value indicative of whether there are (i) no seed grains present in each of the one or more sowing holes, (ii) one seed grain present in each of the one or more sowing holes, or (iii) more than one seed grain present in each of the one or more sowing hole, and an automated control device providing control signals for controlling actuating elements that influence occupancy of the one or more sowing holes, wherein the automated control device directly changes the occupancy of the one or more sowing holes in the receiving section of the sowing heart through direct control of the actuating elements, wherein the occupancy of the one or more sowing holes is changed by the automated control device depending on a deviation of the actual occupancy value determined by the evaluation unit from a predetermined setpoint occupancy value; and a tank for supplying the seed grains to the sowing heart.

* * * * *